June 27, 1967 P. R. SCHRANTZ 3,327,967
SATELLITE BLADE RETAINING DEVICE

Filed March 31, 1965 2 Sheets-Sheet 1

PAUL R. SCHRANTZ
*INVENTOR.*

BY

*Claude Funkhouser*

ATTORNEY

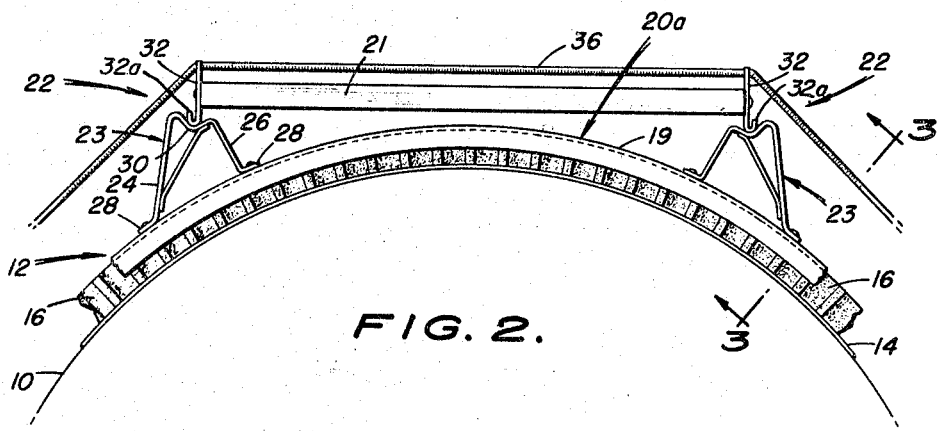
FIG. 2.
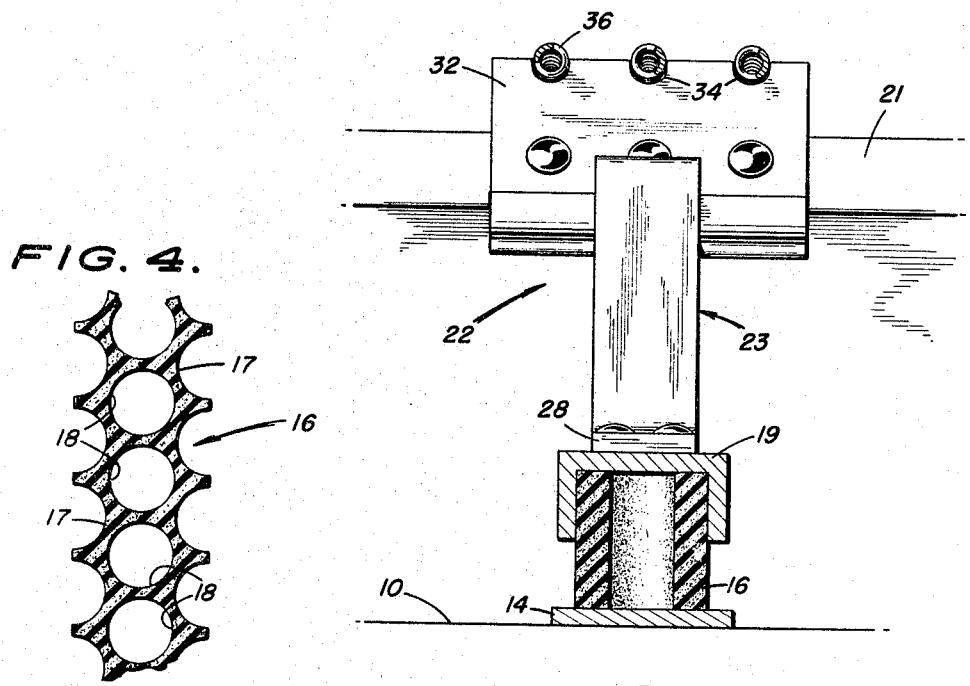
FIG. 4.
FIG. 3.
PAUL R. SCHRANTZ
INVENTOR.

United States Patent Office 3,327,967
Patented June 27, 1967

3,327,967
SATELLITE BLADE RETAINING DEVICE
Paul R. Schrantz, Silver Spring, Md., assignor to the United States of America as represented by the Secretary of the Navy
Filed Mar. 31, 1965, Ser. No. 444,467
8 Claims. (Cl. 244—1)

The present invention relates to a satellite blade retaining device for securing the outer end portions of the solar cell blades, utilized by certain types of satellites, to the casing of a launching vehicle while protecting said blades against the thermal expansion of the vehicle casing.

In earlier satellite launching systems the components connected to the external casing of a launching vehicle were affixed thereto without allowance for the thermal expansion of the casing during lift-off. In later designs heavier mounting hardware was often utilized to compensate for the forces resulting from the thermal expansion of the vehicle casing. The reinforced mounting hardware, however, was also susceptible to thermal expansion and damage to the satellite components often occurred. As launching systems advanced their improved rocket engines, by necessity, operated at higher temperatures, thereby increasing the problem of thermal expansion.

It is, therefore, one object of the present invention to provide a retaining device for securing the outer end portions of the solar cell blades, utilized by certain types of satellites, to the case of the launching vehicle for such satellites, in a manner which will insure the integrity of said blades against the forces of thermal expansion.

Another object of the instant invention is to provide a satellite blade retaining device which will allow the casing of the launch vehicle to expand with a minimum of restraint.

A further object of this invention is to provide a retaining device which will isolate the end portions of solar cell blades from heat, shock, and vibration which would otherwise be transmitted thereto from the launching vehicle during a launching operation.

Still another object of the invention resides in providing a satellite blade retaining device which is of small size, light in weight, and which may be economically produced.

Other objects and many of the attendant advantages of this invention will be readily appreciated as the same becomes better understood by reference to the following drawings, wherein:

FIG. 2 is an enlarged detail top view showing the retaining device partially cut away;

FIG. 3 is a detail sectional view on the line 3—3 of FIG. 2; and

FIG. 4 is a section view of a portion of the expansion absorbing ring.

Figure 1:
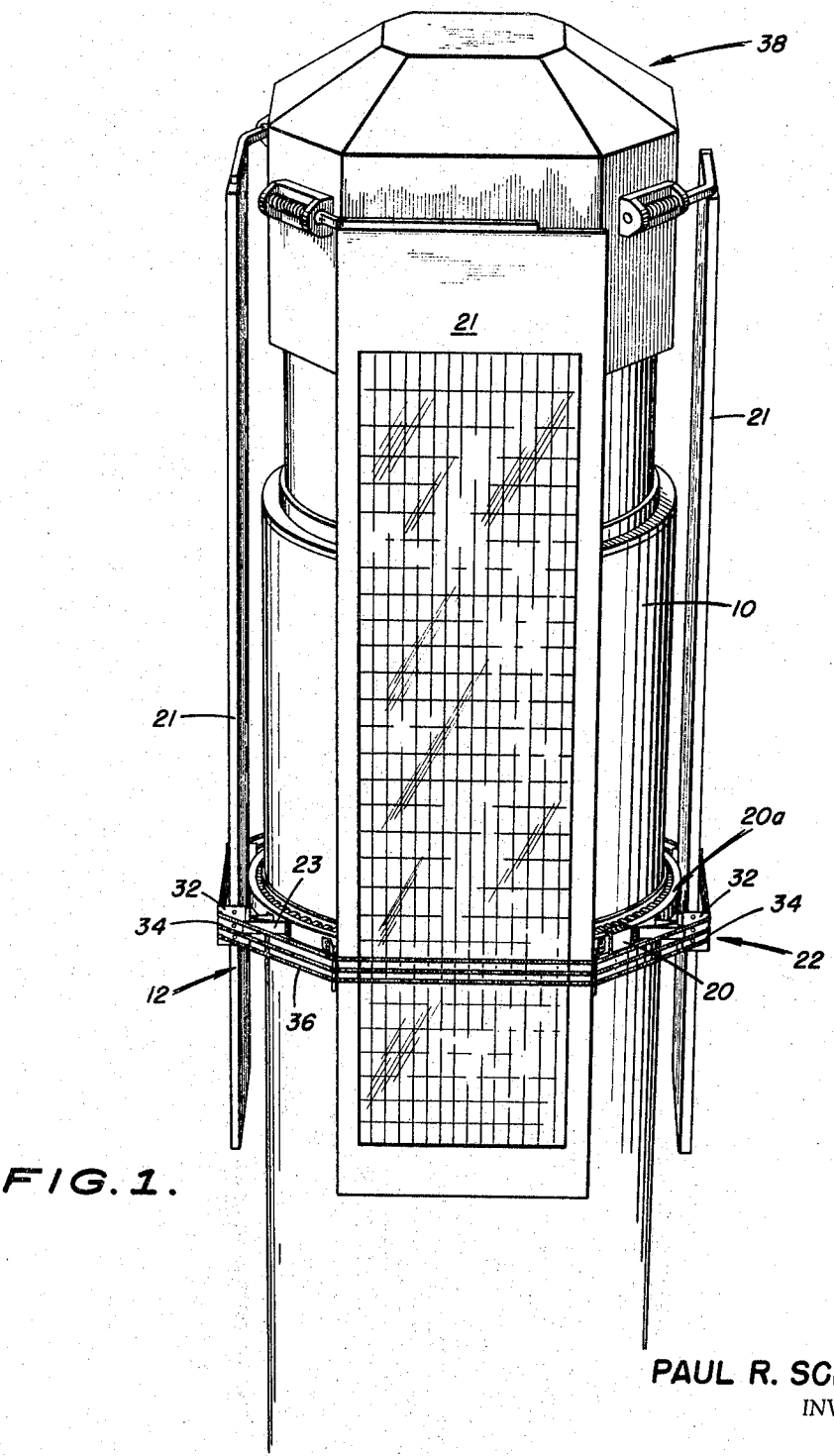
FIG. 1 is a perspective view of the upper portion of a launching vehicle, showing a satellite and its solar cell blades with their associated solar cell blade retaining device.

The solar cell blade retaining device is constructed from a plurality of concentric rings, combined to form an expansion absorbing mounting base, on which are mounted standoffs that receive portions of a pay load, such as the end portions of the solar cell blades utilized by certain satellites. The rings which constitute the base include an attaching strap contiguously secured to the casing of the launching vehicle, an elastomeric expansion absorbing ring bonded to the strap for absorbing the expansion of the vehicle casing, and a channelled supporting ring which surrounds the outer annular portion of the expansion absorbing ring. Pairs of spaced brackets are mounted on the supporting ring and receive portions of the solar cell blades to be retained, clips being provided on each blade for properly positioning said blade on its bracket. Surrounding the launching vehicle and securing the solar cell blades to their brackets are cables which engage in notches in the outer edges of the clips.

One embodiment of the present invention is illustrated in FIG. 1 wherein a rocket of a satellite launching vehicle is shown at 10. The satellite blade retaining device is shown generally at 12 and is located on the casing 10 near its upper end and confronting the lower end portions of the solar cell blades when said blades are in their folded positions. As best seen in FIG. 2, the retaining device includes an attaching strap 14 that contiguously surrounds the casing of the rocket 10 and is constructed from a metallic material having the same coefficient of thermal expansion as the casing itself. Due to this arrangement the strap will always be in tight fitting relationship with the vehicle casing. Mounted on the strap 14, as by bonding, is an expansion absorbing ring 16, which may be constructed of an elastomeric material such as silicone sponge rubber. As shown in FIG. 4, the expansion absorbing ring 16 has a series of semicircular channels 17 disposed in spaced relation along the opposite edges thereof. These channels 17 are perpendicular to the longitudinal axis of the launching vehicle and, therefore, parallel with the direction of expansion of the vehicle casing 10. The expansion absorbing ring 16 is further relieved along its central portion by a row of tubular open ended cavities 18 which are offset to and parallel with said semicircular channels 17. The channels 17 and cavities 18 function to increase the ability of the absorbing ring 16 to withstand and absorb the vehicle casing expansion. Encompassing the expansion ring 16 is an external supporting ring 19 consisting of a pair of channelled members forming companion semi-circular sections joined at their mating ends by a pair of channelled end plates 20. The combination of the strap, absorbing ring, and supporting ring forms an annular base 20a which absorbs the thermal expansion of the vehicle casing and provides a mounting for standoff assemblies to be described hereinafter.

For properly spacing the solar cell blades from the casing 10, standoff assemblies 22 are provided, each said assembly including a pair of spaced brackets 23, attached to the base 20a, and a pair of cooperating clips 32 on each of said blades. More specifically, the brackets 23 are each of inverted U shape, having a relatively long leg 24 and a relatively short leg 26, said legs terminating in tabs 28 which are secured to a supporting ring 19 of the base 20a. The bight of each of the U shaped brackets 23 is curved inwardly to provide a seat 30 for one of the clips 32. It should be noted, in this connection, that the clips of each pair are mounted on the edges of the blades in opposed relation and have rolled inner end portions 32a for engagement in the seats 30. The outer ends of the clips extend beyond the outer surfaces of the blades and are provided with spaced notches 34.

During satellite launch the solar cell blades are retained in folded positions and in engagement with the standoff assemblies 22 by cables 36. Said cables surround the rocket 10 and blades 21 and engage in the notches 34 in the clips 32. Suitable cable release mechanism (not shown) functions to release the cables and free the blades prior to separation of the satellite from the rocket.

Solar cell blades 21 are supported at their upper ends by a satellite 38 which is mounted on the rocket 10 for launching thereby. As shown in FIG. 1, the blades are folded to lie parallel to the axis of the satellite and rocket, with their corresponding lower end portions confronting the base 20a.

In a typical operation, the satellite blade retaining device is assembled around the casing of a launching vehicle with a preloaded pressure of approximately 0.5 p.s.i. on the expansion absorbing ring 16. After lift-off, the vehicle casing undergoes a thermal expansion of approximately 3/8 of an inch across its diameter. This increase places the expansion absorbing ring 16 under a load of approximately 12 p.s.i. and causes the supporting ring 19 to increase about .001 inch across its diameter. This slight increase in diameter results in no substantial increase in tension in the cables 36, thereby producing no damage to the solar cell blades 21.

It is to be understood that the embodiment described hereinabove covers but one of many uses for the present invention. That is, the payload described above should not be limited to solar cell blades but may include other devices, such as stabilizing arms or antennae.

Obviously, many modifications and variations of the present invention are possible in the light of the above teachings. It is therefore to be further understood that within the scope of the appended claims the invention may be practiced otherwise than as specifically described.

What is claimed is:

1. In combination with a rocket having an expandable casing, and a satellite on the rocket for launching thereby, said satellite having solar cell blades folded to lie parallel to the casing during launching of the rocket and satellite,
   a solar cell blade retaining device for retaining the blades to lie in said folded positions, comprising,
   a base on the rocket casing,
   standoff assemblies on the base and spacing the blades from the casing, and
   means for retaining the blades in engagement with the standoff assemblies,
   said base including means for absorbing expansion of the casing.

2. The combination recited in claim 1, wherein said last-mentioned means includes an absorbing ring of elastomeric material.

3. In a solar cell blade retaining device surrounding a thermally expandible rocket casing,
   a thermally expandable strap,
   an absorbing ring on the strap,
   an external supporting ring mounted on the absorbing ring,
   means on said supporting ring spacing a solar cell blade from the rocket casing,
   said first-mentioned ring absorbing thermal expansion of said strap, whereby
   said means and a solar cell blade spaced thereby will be protected from the effects of such strap expansion, and
   detachable means for retaining a solar cell blade in engagement with said spacing means.

4. A solar cell blade retaining device as recited in claim 3, wherein said first-mentioned means includes a pair of spaced brackets mounted on the external supporting ring.

5. In combination with a satellite having a plurality of solar cell blades, and a rocket mounting the satellite and having a casing expandable by heat,
   a solar cell blade retaining device for retaining the blades in folded positions in parallel spaced relation to the casing prior to their deployment, comprising,
   an attaching strap fitted about the rocket casing and expandable therewith,
   an expansion absorbing ring mounted on the strap,
   an external supporting ring mounted on the expansion absorbing ring,
   said strap and rings forming a circular base,
   standoff assemblies on the base and spacing the blades from the wall of the rocket casing, and
   detachable means for retaining the blades in engagement with the standoff assemblies.

6. The combination recited in claim 1, wherein the standoff assemblies each include,
   a pair of spaced brackets, and
   a pair of clips on each solar cell blade, one of said clips being engageable with a bracket of each pair of spaced brackets.

7. The combination recited in claim 6, wherein the brackets of each pair are provided with seats, and
   the clips are provided with rolled inner end portions for engagement with said seats.

8. The combination recited in claim 7, wherein the clips are formed with notches in their outer ends, and
   said blade retaining means comprises cables having portions anchored in said notches.

References Cited

UNITED STATES PATENTS

| 3,181,824 | 5/1965 | Anania | 244—138 |
| 3,253,810 | 5/1966 | Penn | 244—138 |

OTHER REFERENCES

Missiles and Space Flight, in Flight International, Oct. 10, 1963, pp. 623–626.

FERGUS S. MIDDLETON, *Primary Examiner.*